United States Patent [19]

Hatanaka et al.

[11] 4,119,395
[45] Oct. 10, 1978

[54] METHOD OF RECOVERING HEAT OF COMBUSTION WASTE GAS ARISING FROM GLASS TANK FURNACE

[75] Inventors: Kyohei Hatanaka; Hajime Inoue, both of Matsusaka; Haruya Hisatomi, Kamifukuoka; Koya Okuda, Chiba; Takeshi Suzuki, Himeji; Mikio Murao; Susumu Utiyama, both of Kobe, all of Japan

[73] Assignees: Central Glass Co., Ltd., Ube; Kawasaki Jukogyo Kabushiki Kaisha, Kobe, both of Japan

[21] Appl. No.: 725,532

[22] Filed: Sep. 22, 1976

[30] Foreign Application Priority Data

Sep. 27, 1975 [JP] Japan .................................. 50-116656
Sep. 27, 1975 [JP] Japan .................................. 50-116657
Sep. 27, 1975 [JP] Japan .................................. 50-116658
Sep. 27, 1975 [JP] Japan .................................. 50-116661

[51] Int. Cl.² ............................................. F23D 11/44
[52] U.S. Cl. ........................................ 431/11; 55/77;
55/99; 55/390; 55/479; 65/27; 65/335;
431/215; 432/215

[58] Field of Search ....................... 432/215, 179, 180;
431/215, 11; 65/27, 335, 134; 55/77, 99, 390, 479

[56] References Cited

U.S. PATENT DOCUMENTS 3,630,501 12/1971 Shabaker ......................... 432/215 X
3,953,190 4/1976 Lange ..................................... 65/335

Primary Examiner—Edward G. Favors
Attorney, Agent, or Firm—Blanchard, Flynn, Thiel, Boutell & Tanis

[57] ABSTRACT

A powdery substance in suspension state is heated with the high-temperature combustion waste gas exhausted from a glass tank furnace, and the air for combustion is heated with the thus heated powder substance. When the powdery substance employed is a raw material for preparing glass, the raw materials for preparing glass and the air for combustion to be supplied to the glass tank furnace are both heated therewith thereby contributing to effective recovery of the heat of the combustion waste gas.

17 Claims, 6 Drawing Figures

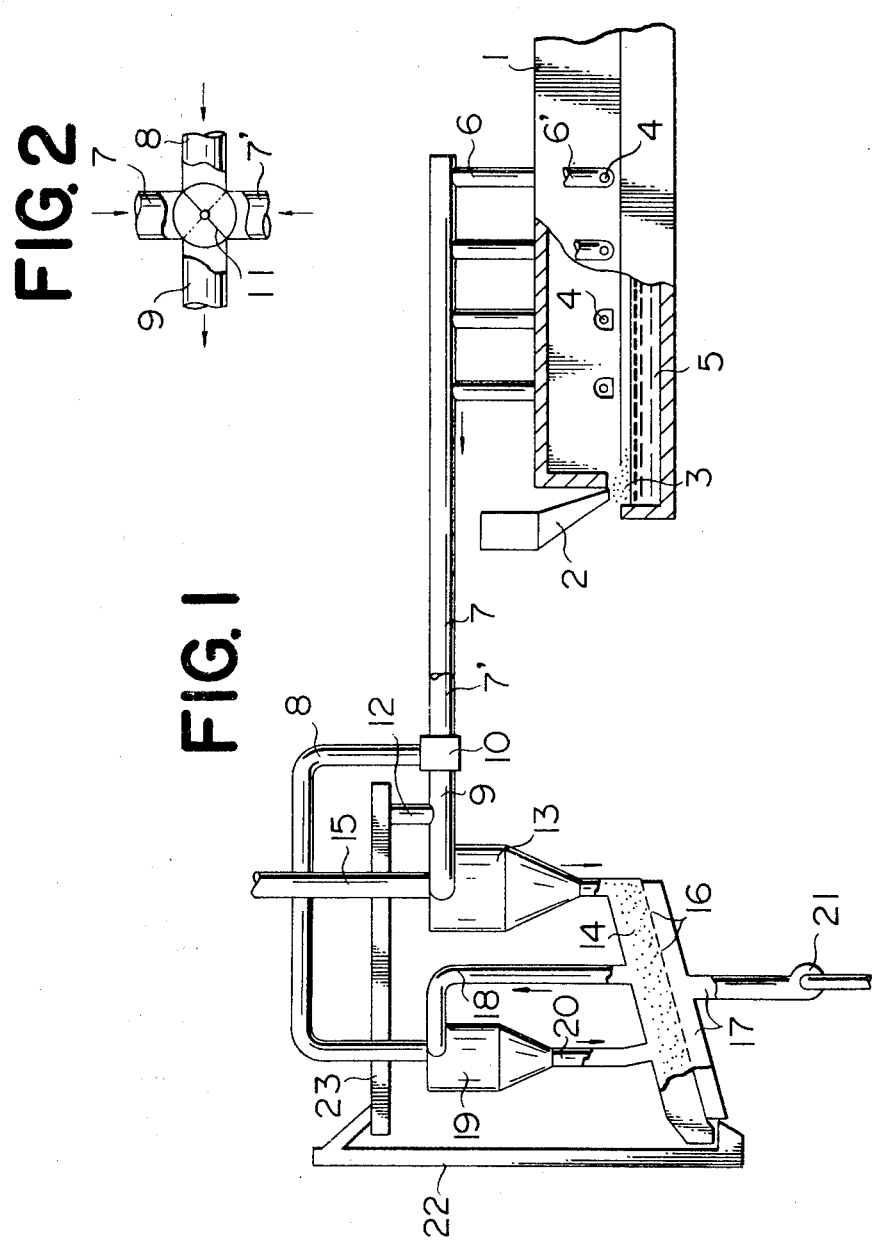

——·—— COMBUSTION WASTE GAS
————— POWDERY SUBSTANCE
------- AIR FOR COMBUSTION

METHOD OF RECOVERING HEAT OF COMBUSTION WASTE GAS ARISING FROM GLASS TANK FURNACE

BACKGROUND OF THE INVENTION (a) Field of the Invention

The present invention relates to a method of recovering the heat possessed by the high-temperature combustion waste gas exhausted from a glass tank furnace, which method comprises contacting said combustion waste gas with a powdery substance in suspension state thereby to heat said powdery substance and heating the air for combustion and/or the raw materials for glass with the thus heated powdery substance.

(b) Description of the Prior Art

The conventional glass tank furnace has a structure wherein, on both sides of the melting furnace, there are disposed bilateral regenerators containing checker bricks piled up so as to leave spaces therebetween and arranged in parallel with heavy oil burners respectively. The flames are jetted from the heavy oil burners arranged on one side and also the air for combustion which has passed through the regenerators on the same side is blown into the melting zone, while into the regenerators of the other side is drawn the high-temperature combustion waste gas simultaneously therewith. The blowoff and suction are alternately performed on the two sides of the furnace at regular intervals.

The air for combustion is usually preheated in the course of passing through the spaces between the checker bricks of the regenerators, previously heated with the combustion waste gas, immediately before it is blown into said melting furnace. The preheated air for combustion is the source of oxygen for burning the heavy oil or the like in the melting furnace.

However, according to the above described method of preheating the air for combustion utilizing regenerators, the heat held by the regenerators diminishes with the passage of time because the heat is gradually withdrawn by the air for combustion. Accordingly the temperature of the preheated air for combustion gradually is reduced thereby rendering it difficult to supply air for combustion which is preheated at a constant temperature. The resulting thermal fluctuation of the air for combustion is undesirable from the view point of efficient operation of the melting furnace for glass. And, what is more, the cost of construction of the regenerators accounts for a great portion of the total expenditure for a glass tank furnace.

With respect to the raw materials for glass, various methods of preheating same have hitherto been proposed, but none of them has proved satisfactory. As a consequence, application of the conventional method of supplying low-temperature raw materials for preparing glass to a melting furnace and melting them by the use of heavy oil or the like remain unchanged. However, this conventional method is not desirable from the view point of economy of fuel as well as efficient melting of glass.

SUMMARY OF THE INVENTION

The primary object of the present invention is to provide a method of recovering the heat of the combustion waste gas generated in a glass tank furnace which method can eliminate the above discussed drawbacks of the conventional method, thereby to improve the heat recovery efficiency, render it possible to dispense with the regenerators whose cost of construction accounts for a great portion of the total expenditure for a glass tank furnace or reduce the size thereof, and further economize fuel such as heavy oil and the like.

In other words, the present invention provides a method of recovering the heat of the combustion waste gas generated in a glass tank furnace, which comprises contacting the high-temperature combustion waste gas exhausted directly or indirectly from a glass tank furnace with a powdery substance in suspension state thereby to heat said powdery substance, and utilizing the heat of the thus heated powdery substance.

The secondary objects of the invention and the particulars of the invention will be understood from the descriptions in the following.

BRIEF DESCRIPTION OF THE DRAWINGS

In the appended drawings:

FIG. 1 is a schematic representation of an apparatus relevant to a mode of application of the method of the present invention wherein there is diagrammatically shown the flow paths in the case of heating a powdery substance with the combustion waste gas and preheating the air for combustion with the thus heated powdery substance;

FIG. 2 is a plan view, partially broken away, of the switchover valve of the apparatus in FIG. 1;

DESCRIPTION OF THE PREFERRED EMBODIMENT

Figure 3:
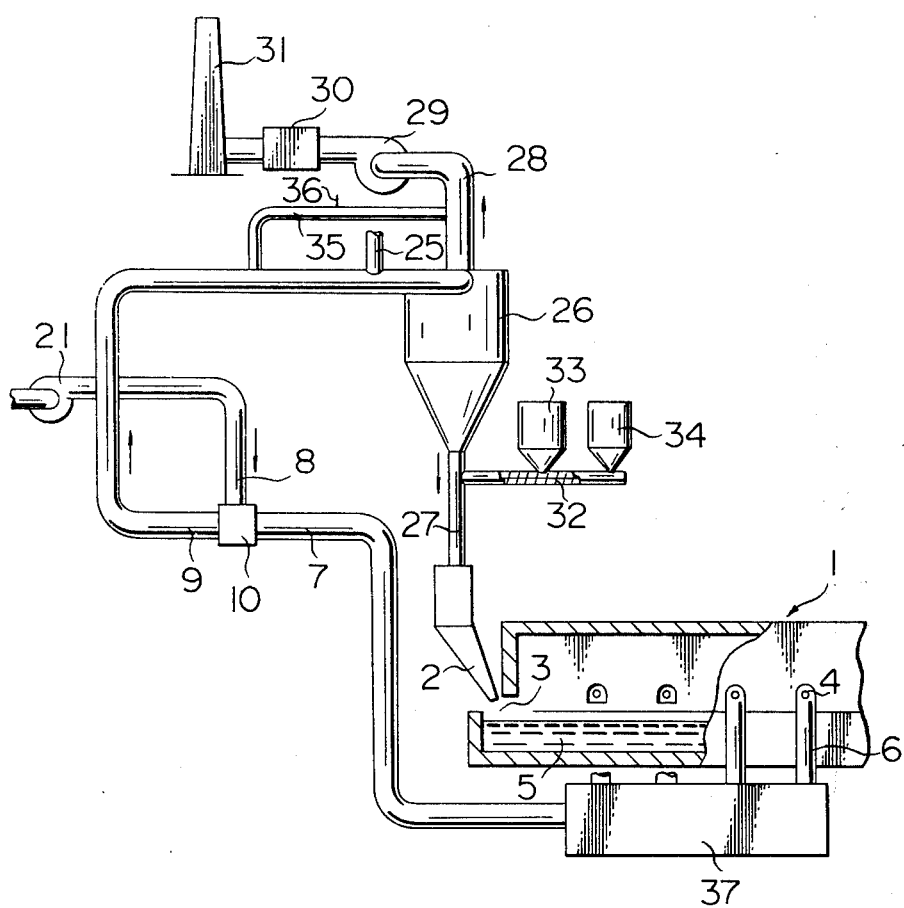
FIG. 3 is a schematic representation of an apparatus relevant to another mode of application of the method of the present invention wherein there is diagrammatically shown the flow paths in the case of preheating powdery raw materials for glass with the combustion waste gas.

Particulars of the invention will be hereunder explained with reference to the appended drawings.

The present invention is, as set forth above, characterized in that the high-temperature combustion waste gas exhausted from a glass tank furnace is made to contact a powdery substance in suspension state thereby to transmit the heat of said combustion waste gas to said powdery substance and the heat of the thus heated powdery substances is utilized by employing said powdery substance as a heat transfer medium.

FIG. 1 through FIG. 6 illustrate concrete examples of the mode of utilization of the heat recovered by the method according to the present invention.

Referring to FIG. 1, the powdery raw materials for glass 3 are supplied from the hopper 2 disposed at one end of a rectangular glass tank furnace 1. Along both sides of the melting furnace are bilaterally arranged the heavy oil burners 4 through which flames are blown into the melting furnace to melt the raw materials for glass thereby forming the molten glass 5. From the other end, which is not shown in the drawing, of the melting furnace is drawn out the molten glass to be formed into flat glass. As the raw materials for making glass, powdery quartz sand, soda ash, dolomite and lime stone, with the addition of cullet, Glauber's salt, etc. for the purpose of expediting the melting and the refining, are applicable.

In the vicinity of the burners 4 are disposed the branch ducts 6, 6' for the purpose of supplying the air for combustion and/or taking out the combustion waste gas, said branch pipes communicating with the main ducts 7, 7', respectively, on the opposite side of the melting furnace. These main ducts are connected with the duct 8 for supplying the air for combustion and the duct 9 for taking out the combustion waste gas by means of the switchover valve 10. In the switchover valve 10 is pivotally mounted the rotatable valve plate 11 as shown in FIG. 2. With the rotation of this valve plate 11, switchover is performed so that the air for combustion is supplied to the heavy oil burner's port by way of the ducts 8, 7 and 6 and the combustion waste gas is exhausted by way of the ducts 6', 7' and 9, or the air for combustion is supplied by way of the ducts 8, 7' and 6' and the combustion waste gas is exhausted by way of the ducts 6, 7 and 9, alternately.

A powdery substance serving as the heat transfer medium for effecting heat exchange between the waste gas and the air for combustion is supplied from the branch pipe 12 of the duct 9, is dispersed in the high-temperature combustion waste gas to become suspended therein and is heated within the horizontal duct leading from the branch pipe 12 to the cyclone 13, and then blown into the cyclone 13 tangentially from the exterior of the cylindrical upper part of said cyclone. Within the cyclone 13, the powdery substance falls while circling toward the bottom of cyclone, and it is separated from the combustion waste gas, and lands on the upper extremity of the fluidized bed type heat exchanger 14. The combustion waste gas after imparting heat to the powdery substance is taken out of the center pipe of the cyclone 13 by way of the duct 15. In this connection, by providing a by-pass connecting the duct 9 with the duct 15 and disposing a controlling valve in said by-pass, the pressure within the furnace 1 can be maintained to be constant.

The fluidized bed type heat exchanger 14 consists of a cylindrical body whose bottom face is provided with a multiplicity of air-blasting nozzles 16, said air-blasting nozzles 16 being of regulated injection angle and distribution. The air for combustion is conducted to the air supply pipe 17 by means of the blower 21 and then is put in the fluidized bed type heat exchanger 14 under pressure by way of the air-blasting nozzles 16, whereby it forms a fluidized bed together with the heated powdery substance in said heat exchanger 14 and is preheated. Subsequently, the thus preheated air for combustion is taken out of the pipe 18, sent to the cyclone 19 and separated from the accompanying dust of powder which is supposed to be returned to the heat exchanger 14 from the bottom portion of the cylone 19 by way of the pipe 20. The preheated air for combustion thus separated from said dust of powdery substance is supplied to the glass tank furnace 1 by way of the duct 8 and the switchover valve 10.

The powdery substance taken out of the heat exchanger 14 is again conducted to the branch pipe 12 by way of the bucket elevator 22 and conveyor 23, and recycled for the above described process. As the powdery substance for use in the present invention, any substance is applicable provided that it is free from thermal cracking and thermal softening caused by contact with the high-temperature combustion waste gas. By virtue of utilizing such a powder substance as a heat transfer medium, the air for combustion can be preheated at a constant and desired temperature.

FIG. 3 is a schematic representation of an apparatus relevant to another mode of application of the method of the present invention, which is so devised that the combustion waste gas coming out of the glass tank furnace 1 is conducted to the main duct 7 from the branch duct 6 via the regenerator 37. The termination of the duct 9 for taking out the waste gas is tangentially connected with the cylindrical upper part of the cyclone 26, the branch pipe 25 for supplying the raw materials for glass is provided on the duct 9, and the raw materials for glass are dispersed in the combustion waste gas so as to achieve a suspension state therein and are heated while passing through the horizontal duct and thereafter are blown into the cyclone 26. Within the cyclone 26, the powdery raw materials for glass fall while circling, accumulate on the bottom of cyclone, are separated from the combustion waste gas, enters the hopper 2 by way of the pipe 27, and are supplied to the glass tank furnace 1.

The combustion waste gas taken out of the center pipe of the cyclone 26 is released from the stack 31 into the atmosphere after passing through the pipe 28, the blower 29 and the waste gas treating device 30 which performs removal of harmful gases and so on.

In the case where the flow rate of the combustion waste gas blown in the cyclone 26 from the duct 9 fluctuates, the pressure within the furnace 1 can be maintained to be constant by, for instance, connecting the duct 9 with the pipe 28 by means of the pipe 35, providing the controlling valve 36 in the pipe 35, detecting the pressure of the furnace 1, etc. and actuating the controlling valve 36 according to signals indicating the detected pressure.

In this connection, the waste gas in this mode of application of the invention is a waste gas which has been conducted to the regenerator 37 from the glass tank furnace 1 by way of the branch duct 6 and subjected to heating with the checker bricks in said regenerator. That is, in the method of the present invention, the combustion waste gas includes either the combustion waste gas exhausted directly from the glass tank furnace 1 or the combustion waste gas exhausted indirectly from said furnace 1, and particularly in the case where the present method is combined with the regenerator, reduction of the size of regenerator and improvement of the thermal efficiency can be realized.

Figure 4:
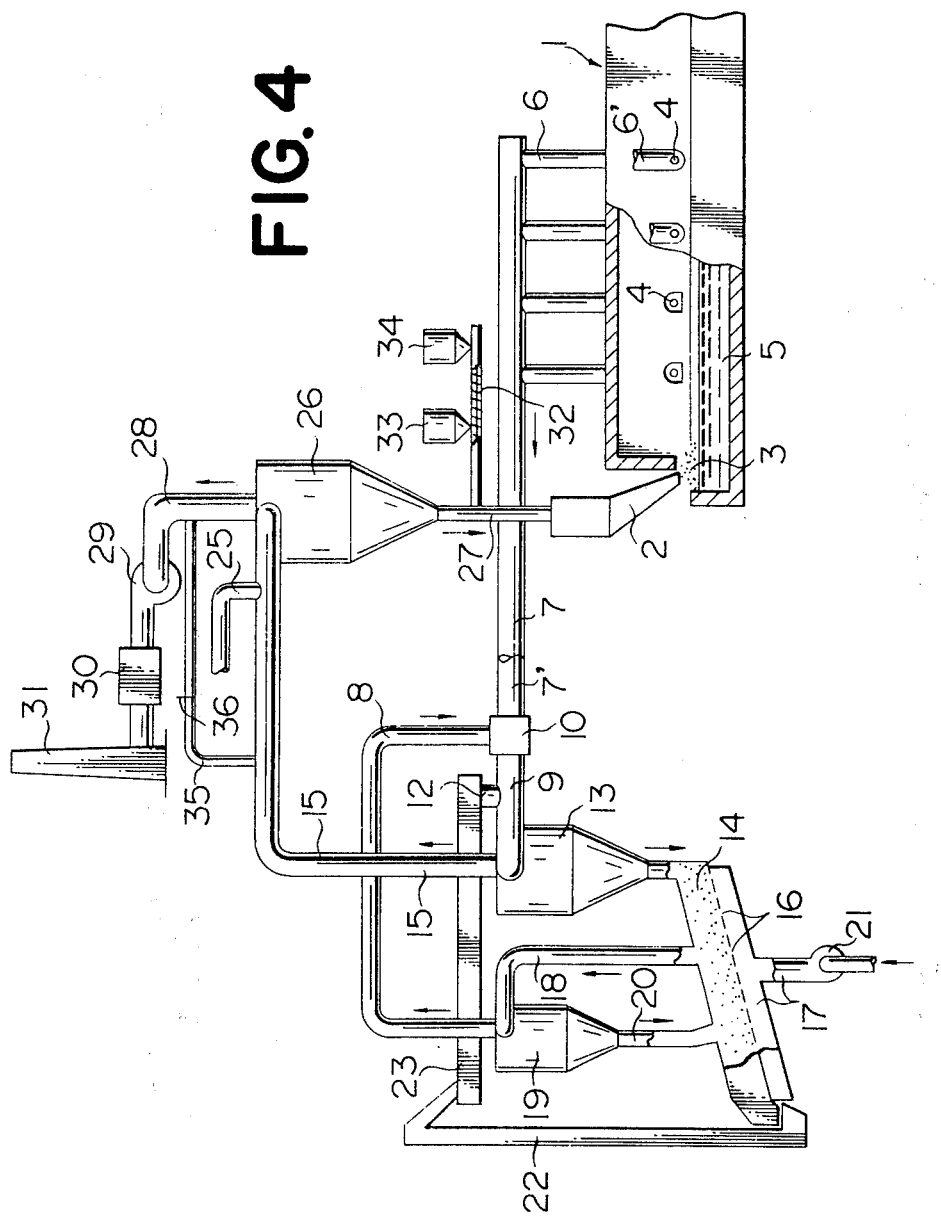
FIG. 4 is a schematic representation of an apparatus relevant to still another mode of application of the method of the present invention wherein there is diagrammatically shown the flow paths in the case of heating a powdery substance with the combustion waste gas and preheating the air for combustion with the thus heated powdery substance while preheating the raw materials for glass with the waste gas.

FIG. 4 is a schematic representation of an apparatus relevant to still another mode of application of the method of the present invention, which is so devised that the combustion waste gas coming out of the glass tank furnace 1 is blown onto the cyclone 13 tangentially from the exterior of the cylindrical upper part of said cyclone 13 after heating a powdery substance in suspension state serving as the heat transfer medium supplied from the branch pipe 12, by way of the duct 9 for taking out the waste gas. The powdery substance heated with the combustion waste gas is separated from the waste gas by means of the cyclone 13 and is conveyed within the sloped fluidized bed type heat exchanger 14 thereafter. In the course of being conveyed, the heated powdery substance forms a fluidized bed together with the air for combustion put in the heat exchanger 14 under pressure through the air-blasting nozzles 16 by way of the pipe 17 for supplying the air for combustion thereby to preheat the air for combustion, and then is again supplied to the duct 9 for taking out the waste gas by way of the branch pipe 12 and cycled for reuse. The preheated air for combustion is completely separated from the powdery substance and thereafter is supplied to the glass tank furnace 1.

Meanwhile, the combustion waste gas taken out through the duct 15 and still holding a high temperature is utilized for heating the compounded powdery raw materials for glass supplied through the branch pipe 25 and being in suspension state and is blown into the cyclone 26. Within the cyclone 26, the powdery raw materials for glass fall while circling on the bottom of cyclone, are separated from the combustion waste gas, enter the hopper 2 by way of the pipe 27, and are supplied to the glass tank furnace 1.

Figure 5:
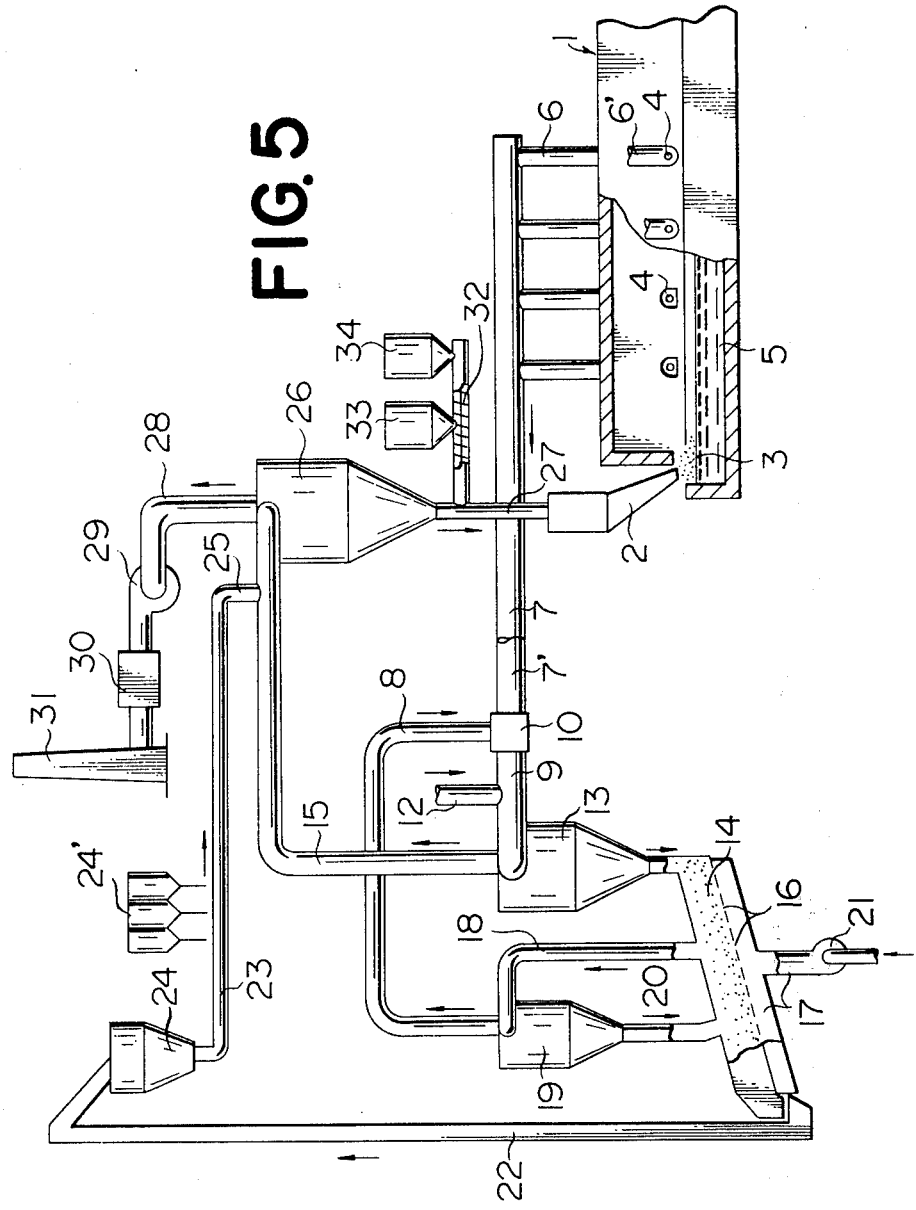
FIG. 5 is a schematic representation of an apparatus relevant to yet another mode of application of the method of the present invention wherein there is diagrammatically shown the flow paths in the case of heating at least one member of the raw materials for glass with the combustion waste gas, preheating the air for combustion with the thus heated one member of the raw materials for glass, and further preheating the raw materials for glass with the waste gas.

FIG. 5 is a schematic representation of an apparatus relevant to yet another mode of application of the method of the present invention, which is so devised that at least one member of the raw materials for glass is supplied by way of the branch pipe 12 of the duct 9, heated with the combustion waste gas in suspension state, and thereafter blown into the cyclone 13 tangentially from the exterior of the cylindrical upper part of said cyclone 13 together with the waste gas. Within the cyclone 13, the powdery raw materials for glass fall while circling on the bottom of cyclone, are separated from the waste gas and, while being conveyed within the sloped fluidized bed type heat exchanger 14, preheat the air for combustion supplied through the air supply pipe 17. As at least one member of the raw materials for glass to serve as the heat transfer medium for preheating the air for combustion, quartz sand is optimum. Quartz sand is the principal component of the raw materials for glass and is employed in a large quantity, and besides, it is hard and is not readily decomposed or melted when subjected to heating at high temperature. The preheated air for combustion is supplied to the glass tank furnace 1 after separating from the raw materials for glass.

The raw materials for glass taken out of the heat exchanger 14 are supplied to the duct 15, to which the high-temperature combustion waste gas is still being supplied, by way of the bucket elevator 22, storing tank 24, conveyor 23 and branch pipe 25, dispersed in the waste gas to be heated therewith in suspension state, and thereafter blown into the cyclone 26 together with said waste gas. Above the conveyor 23 are disposed the hoppers 24' for supplying fellow raw materials for glass. Within the cyclone 26, the powdery raw materials for glass fall while circling on the bottom of cyclone, are separated from the combustion waste gas, enter the hopper 2 through the pipe 27 thereafter, and are supplied to the glass tank furnace 1.

Although not illustrated herein, it also will do to apply a mode wherein at least one component of the powdery raw materials for glass is preheated with the combustion waste gas in suspension state and the thus preheated component of powder raw materials is supplied to the glass tank furnace 1 after separating from the combustion waste gas, while a powdery substance in suspension state is heated with the combustion waste gas after heating the raw materials for glass and the air for combustion is preheated with the thus heated powdery substance, the thus preheated air for combustion is supplied to the glass tank furnace 1, and the powdery substance is cycled for reuse.

In the case of preheating the powdery raw materials for glass within a duct-cyclone, if the content of water in the raw materials for glass is more than a certain extent, there is the possibility of causing bridging, and therefore, it is necessary to dry the raw materials for glass to be supplied to the duct-cyclone beforehand thereby to reduce the content of water to below a fixed value. Moreover, inasmuch as the raw materials for glass in the state of suspension contact with the high-temperature waste gas to be heated therewith, carbon among the raw materials for glass is likely to oxidize and burn or scatter depending on the shape and amount thereof as well as the temperature of the combustion waste gas and the amount of oxygen remaining therein. In such a case, it is advisable to admix carbon by adding separately at the time when the raw materials for glass come out of the cyclone 26 and stream down through the pipe 27. This addition of carbon is performed by attaching the feeder 32 with the storing tank 33 to the pipe 27 and sending carbon stored in the tank 33 by means of the feeder 32 into the pipe 27 in concert with the streaming of fellow raw materials for glass thereby uniformly admixing a fixed amount of carbon in the raw materials for glass.

As cullet to be admixed as a raw material for glass, fragments of solidified glass obtained from the glass tank furnace are utilized. This cullet is employed in the condition of fairly coarse grains compared with fellow raw materials for glass. Cullet of such conditions, when passed through the cyclone together with fellow raw materials for glass, is likely to damage the wall of machinery and tools, to wit, cyclone and so forth, depending on the quality of materials therefor. In such a case, it is advisable to attach the storing tank 34 to the aforesaid feeder 32 and send cullet stored in the tank 34 together with carbon by means of the feeder 32 into the pipe 27 at a fixed feed rate thereby uniformly admixing said cullet in the raw materials for glass.

Whenever scales arise on the inner wall of the cyclone, they can be removed by putting cullet by way of the upper part of the cyclone.

As the means of supplying carbon and/or cullet for the purposes set forth above, various devices for feeding a fixed quantity in addition to the foregoing feeder are applicable.

As regards the glass tank furnace 1, in addition to those in the present embodiments, various types of glass tank furnace for the purpose of melting powdery raw materials for glass by burning heavy oil or the like which generate a high-temperature combustion gas are suitable for application of the method of the present invention.

Figure 6:
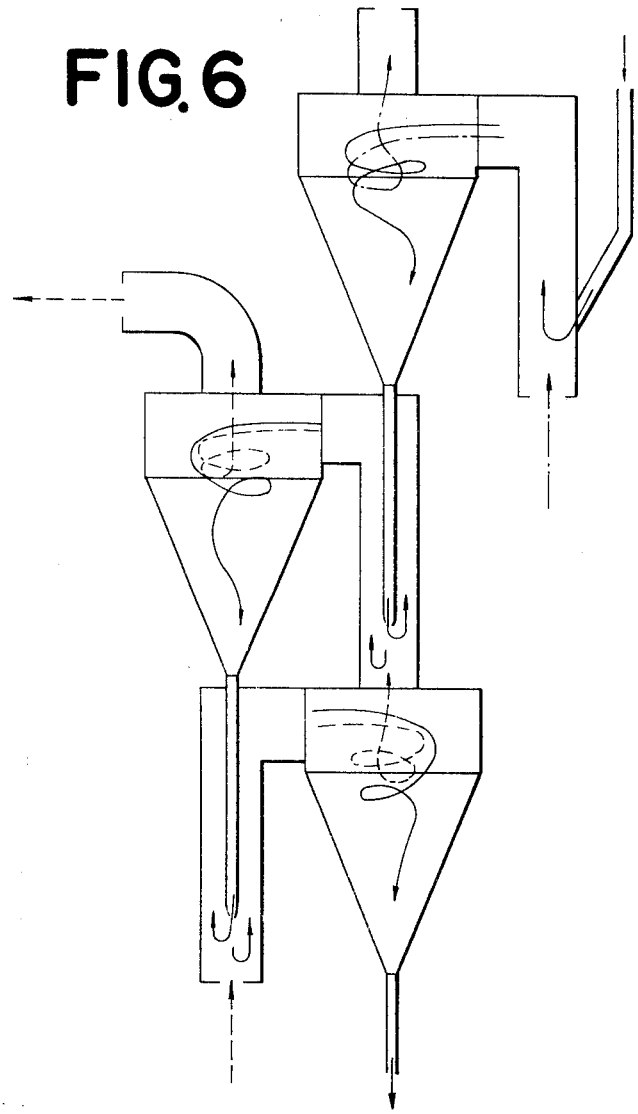
FIG. 6 is a diagram of the heat exchange system utilizing a powdery heat transfer medium.

Besides, the device of effecting heat exchange between the high-temperature waste gas and the powdery substance and further between the powdery substance and the air for combustion is not limited to the mode in the foregoing embodiments. That is, in addition to the above described mode, various devices, such as a device capable of making the powdery substance form a spouted bed or a fluidized bed with the aid of the air for combustion and/or the combustion waste gas, are applicable. Further, a device combining such a device with cyclones as illustrated in FIG. 6 is also effective.

Furthermore, it will do to conduct a part of the waste gas exhausted from the melting furnace directly to a duct-cyclone for use in heating the raw materials for glass, utilize the remainder for preheating the air for combustion and further conduct the resulting waste gas to said duct-cyclone for use in heating the raw materials for glass.

What is claimed is:

1. A method for recovering heat from the high temperature exhaust gas discharged from a glass tank furnace, which comprises the steps of: continuously discharging a first stream of high temperature exhaust gas from a glass tank furnace; continuously dispersing particles of a heat exchange substance in said exhaust gas and flowing said particles and said exhaust gas together in concurrent flow relationship in a duct, said particles having a particle size selected so that said particles are suspended in said exhaust gas to form a second stream consisting essentially of a suspension of said particles in said exhaust gas whereby said particles remain in contact with said exhaust gas and are heated by direct contact with said exhaust gas while in a suspended state therein and while flowing in concurrent flow relationship with said exhaust gas in said duct; feeding said second stream into solid-gas separation means and therein separating said heated particles from said exhaust gas; and then utilizing the heat content of said heated particles to supply heat to a glass tank furnace.

2. A method according to claim 1 wherein said suspension is flowed from said duct into cyclone means to separate said heated particles from said exhaust gas.

3. A method according to claim 1 wherein, after said heated particles have been separated from said exhaust gas, said heated particles are passed in heat exchange contact with a stream of air whereby said air becomes preheated, separating said preheated air from said particles and then feeding said preheated air to the glass tank furnace for use in burning a fuel therein.

4. A method according to claim 3 wherein said suspension is flowed from said duct into cyclone means to separate said heated particles from said exhaust gas.

5. A method according to claim 4 wherein said heated particles discharged from said cyclone means are contacted by said stream of air to form a fluidized bed from which the preheated air escapes upwardly, flowing said preheated air through second cyclone means to separate particles entrained therein, feeding the preheated air from said second cyclone means to said glass tank furnace and recycling said particles for further heating by said exhaust gas.

6. A method according to claim 3, including the steps of continuously dispersing powdery raw materials for making glass in said exhaust gas after said exhaust gas has been separated from said heated particles, said powdery raw materials having a particle size so that they are suspended in said exhaust gas to form a third stream consisting essentially of a suspension of said powdery raw materials in said exhaust gas whereby said powdery raw materials remain in contact with said exhaust gas and are heated by direct contact with said exhaust gas while in a suspended state therein, separating said heated powdery raw materials from said exhaust gas; and then feeding said heated powdery raw materials into a glass tank furnace.

7. A method according to claim 6, including the step of feeding carbon to said glass tank furnace along with said heated powdery raw materials.

8. A method according to claim 6, including the step of feeding carbon and cullet to said glass tank furnace along with said heated powdery raw materials.

9. A method according to claim 1 wherein said particles comprise at least one component which is a raw material for making glass and wherein, after said heated particles are separated from said exhaust gas, said particles are fed into the glass tank furnace.

10. A method according to claim 9 wherein said suspension is flowed from said duct into cyclone means to separate said heated particles from said exhaust gas.

11. A method according to claim 9 wherein said component is quartz sand.

12. A method according to claim 9, including the step of feeding carbon to said glass tank furnace along with said heated powdery raw materials.

13. A method according to claim 9, including the step of feeding carbon and cullet to said glass tank furnace along with said heated powdery raw materials.

14. A method according to claim 9 wherein, after said heated particles have been separated from said exhaust gas, said heated particles are passed in heat exchange contact with a stream of air whereby said air becomes preheated, separating said preheated air from said particles and feeding said preheated air to said glass tank furnace for use in burning a fuel therein, suspending said particles which have been separated from said preheated air and other powdery raw materials for making glass in the exhaust gas which was previously used for heating said particles whereby to reheat said particles and to heat said other powdery raw materials, separating said particles and said other powdery raw materials from said exhaust gas and then feeding them into said glass tank furnace.

15. A method according to claim 14, including the step of feeding carbon to said glass tank furnace along with said heated powdery raw materials.

16. A method according to claim 14, including the step of feeding carbon and cullet to said glass tank furnace along with said heated powdery raw materials.

17. A method according to claim 9 in which after said heated particles are separated from said exhaust gas, particles of a second heat exchange substance are suspended in said exhaust gas and are heated thereby, said heated second particles are passed in heat exchange contact with a stream of air whereby said air becomes preheated, separating said preheated air from said second particles and then feeding said preheated air to the glass tank furnace for use in burning a fuel therein.

* * * * *